(12) United States Patent
Cohn et al.

(10) Patent No.: US 6,322,757 B1
(45) Date of Patent: Nov. 27, 2001

(54) LOW POWER COMPACT PLASMA FUEL CONVERTER

(75) Inventors: Daniel R. Cohn, Chestnut Hill; Leslie Bromberg, Sharon; Alexander Rabinovich, Swampscott, all of MA (US); Nikolai Alexeev, Moscow (RU)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/433,402

(22) Filed: Nov. 3, 1999

Related U.S. Application Data

(63) Continuation-in-part of application No. 09/379,004, filed on Aug. 23, 1999.

(51) Int. Cl.$^7$ ................................................. B01J 19/08
(52) U.S. Cl. ............................. 422/186.04; 422/186.22; 422/186.28; 123/3
(58) Field of Search .................... 422/186.04, 186.22, 422/186.28; 123/3

(56) References Cited

U.S. PATENT DOCUMENTS

| | | | |
|---|---|---|---|
| 3,649,195 | 3/1972 | Cook et al. | 23/209.4 |
| 3,879,680 | 4/1975 | Naismith et al. | 331/94.5 |
| 3,992,277 | 11/1976 | Trieschmann et al. | 204/172 |
| 4,059,416 | 11/1977 | Matovich | 48/197 |
| 4,339,546 | 7/1982 | Randalls | 518/704 |
| 4,625,681 | * 12/1986 | Sutekiyo | 123/3 |
| 5,095,247 | * 3/1992 | Hnamura | 315/111.21 |
| 5,138,959 | 8/1992 | Kulkarni | 110/346 |
| 5,425,332 | 6/1995 | Rabinovich et al. | 123/3 |
| 5,437,250 | * 8/1995 | Rabinovich et al. | 123/3 |
| 5,560,890 | 10/1996 | Berman et al. | 422/186.04 |
| 5,887,554 | 3/1999 | Cohn et al. | 123/3 |
| 6,012,326 | * 1/2000 | Raybone et al. | 422/186.22 |

FOREIGN PATENT DOCUMENTS 197 57 936    7/1999  (DE) .

OTHER PUBLICATIONS

U.S. application No. 09/379,004, Rabinovich et al., filed Aug. 23, 1999.

* cited by examiner

*Primary Examiner*—Kishor Mayekar
(74) *Attorney, Agent, or Firm*—CHOATE, Hall & Stewart (57) ABSTRACT

The plasma fuel converter includes an electrically conductive structure for forming a first electrode and a second electrode is disposed to create a gap with respect to the first electrode in a reaction chamber. A fuel-air mixture is introduced into the gap and the power supply is connected to the first and second electrodes to provide voltage in the range of approximately 100 volts to 40 kilovolts and current in the range of approximately 10 milliamperes to 1 ampere to generate a glow discharge to reform the fuel. The high voltage low current plasmatron of the invention is low cost, has long electrode life, utilizes a simple power supply and control and eliminates the need for an air compressor.

47 Claims, 12 Drawing Sheets

LOW POWER COMPACT PLASMA FUEL CONVERTER

This application is a continuation-in-part of U.S. co-pending patent application Ser. No. 09/379,004 filed Aug. 23, 1999 pending.

BACKGROUND OF THE INVENTION

This invention relates to a plasma fuel converter and more particularly to a low power compact plasma fuel converter employing high voltage and low current.

Plasma fuel converters such as plasmatrons reform hydrocarbons to produce a hydrogen rich gas. DC arc plasmatrons have received particular attention in the prior art. See, for example, U.S. Pat. Nos. 5,425,332 and 5,437,250. DC arc plasmatrons typically operate at low voltage and high current. By operating at high currents and lower voltages, the arc current is high enough that precautions are required to minimize electrode erosion and even melting. High flow rates of cooling water are required to keep the erosion in check. Air flow is required to simultaneously center the discharge on the cathode tip (made of hafnium or other specialized material, embedded in a copper plug) and to move the root of the arc at the anode to minimize erosion at the anode. A constriction is also required to increase the impedance of the discharge (i.e., to operate at high voltages and lower currents than free-flowing arcs). The air flows and the constriction are likely to require operation at elevated pressure (as much as 0.5 bar above ambient pressure), and thus a compressor is likely to be required. Even with these precautions, it is often difficult to extend the lifetime of the electrodes beyond approximately 1,000 hours of operation.

DC plasmatrons also require relatively sophisticated power supplies for stabilization of the arc discharge. Further, DC plasmatrons have a limited capability for low power operation. In some reforming applications, the minimum operating power can be significantly greater than needed resulting in unnecessary power loss. DC arc plasmatrons are typically operated at power levels of one kilowatt or more.

It is therefore desirable to have a plasma fuel converter that does not require a compressor or a sophisticated power supply for stabilization of the arc discharge. It is also desirable to have a plasma fuel converter having longer electrode life and with a capability of lower power operation when lower flow rates of hydrogen rich gas are required.

SUMMARY OF THE INVENTION

In one aspect, the plasma fuel converter of the invention includes an electrically conductive structure forming a first electrode. A second electrode is disposed to create a gap with respect to the first electrode in a reaction chamber. A fuel air mixture is introduced into the gap and a power supply connected to the first and second electrodes provides voltage in the range of approximately 100 volts to 40 kilovolts and current in the range of approximately 10 milliamperes to one ampere to generate a discharge to reform the fuel. The discharge can be a "glow type" discharge, a silent discharge and/or a breakdown discharge. A preferred range for voltage is 200 volts to 20 kilovolts. In a preferred embodiment, the plasma fuel converter includes a reaction extension region to increase residence time in a high temperature zone. An insert in the reaction extension region and in the reaction chamber is provided to increase the temperature of operation. The insert may be metallic or ceramic. A heat exchanger may also be provided to decrease power needed from the power supply.

In this embodiment, it is preferred that the power supply be a current controlled, high voltage power supply such as a power supply including a saturable inductor to limit current. The saturable inductor power supply may be a neon transformer power supply.

The fuel-air mixture is selected for operation between stoichiometric partial oxidation and full combustion depending on conditions and applications. An additional power supply may be provided for simultaneous operation in a low voltage, high current DC arc mode and a high voltage, low current glow discharge mode. The plasma fuel converter may include a plurality of plasma regions to increase hydrogen generation rate. The hydrogen rich gas output of the plasma fuel converter may be brought into contact with a catalyst such as for nitrogen oxide catalyst regeneration.

The plasma fuel converter of the invention reduces or removes the disadvantages associated with DC arc plasmatrons known in the prior art. The disadvantages are overcome by the specially controlled high voltage, low current plasma fuel converter operation. The voltage and current vary over time in such a manner as to limit the current flowing in the plasma. The electrical characteristics of the plasma operation are a voltage range from a few hundred volts and up to 40 kilovolts, and a current range from 10 milliamperes to hundreds of milliamperes. In contrast, the corresponding ranges for DC arc plasmatron fuel reformers are a voltage of around 100 volts and currents starting at 3–5 amperes. A representative high voltage, low current discharge of the plasma fuel converters of the invention has "glow discharge" type features. Typically, this type of atmospheric pressure, high voltage, low current discharge can be made to operate at tens to hundreds of watts of average power. In contrast, DC arc plasmatrons known in the prior art are typically operated at power levels of one kilowatt or more.

The high voltage, low current operation of the high-voltage low-current discharge is maintained by the use of an appropriate power supply such as a conventional AC neon transformer. Neon transformer power supplies use a saturable inductor to limit the current to a relatively low value, on the order of tens to hundreds of milliamps. Such power supplies are also capable of producing open circuit voltages of tens of kilovolts. These power supplies are inexpensive and can be made for the delivery of tens to hundreds of watts.

In contrast, in the case of conventional spark discharges, the capacitive-based power supply delivers a high voltage, short pulse that breaks down the electrode-to-electrode gap and results in a discharge. This breakdown phase is followed by a lower voltage, lower power discharge. Most of the energy is delivered during the relatively long low voltage, low power part of the discharge. The energy delivered per pulsed discharge is small, on the order of tens of millijoules. Average power levels are typically around a few watts which is generally too low for hydrogen production applications.

Thus, in a plasma fuel converter using high-voltage, low-current operation according to the invention, the power that is provided by the discharge can be on the order one-tenth of the minimum power of a compact DC arc plasmatron known in the prior art. The reformer of the invention is therefore appropriate for low hydrogen production rates where it provides enough power to increase substantially the enthalpy of the reactants. Such low rates may be appropriate for some applications, such as catalyst regeneration. High hydrogen production rates are possible by using multiple units. A further increase in hydrogen production rate is possible by increasing the air/fuel ratio and the fuel throughput. Alternatively, the low power, high-voltage low-current plasma is used as an expanded volume igniter and a source of radicals to enhance the partial oxidation reaction with the necessary enthalpy increase provided by other means. These other means include air-fuel chemical reactions and/or heat provided by a heat exchanger. In this mode of operation, substantially all of the enthalpy (at least 80% and preferably 90% or more) is provided by these other means. This mode of operation makes possible higher hydrogen production rates than would otherwise be allowed by constrains on plasma power or generator/battery power supply capability.

In some cases, it may be useful to operate the partial oxidation reaction with additional oxygen (i.e., partial oxidation with an oxygen-to-fuel ratio greater than that for stoichiometric partial oxidation). The oxygen is generally provided by additional air. In this case the hydrogen yield (defined as the fraction of the hydrogen in the fuel that is released in the process) is reduced, but the electrical power requirement is decreased. There is a tradeoff between the electrical power requirement for the plasma and the fuel required in the fuel converter. In the case of additional oxygen, the partial oxidation reaction is facilitated by fully oxidizing a fraction of the fuel and partially oxidizing the rest of the fuel. Using this approach, it is possible to decrease the required electrical power at the expense of increased fuel flow rate for a given rate of hydrogen flow. In some applications where limited amounts of hydrogen are required for a limited amount of time, the additional required fuel does not impact substantially the overall fuel efficiency. However, the reduced power requirements for the plasma, coupled with a much longer lifetime of the electrodes and a much simpler overall system reduces the complexity and cost of the plasma fuel converter.

Alternatively, for the same plasmatron power, an increased air to fuel ratio (as compared to stoichiometric partial oxidation) can be used to increase the hydrogen generation rate by using increased fuel and air throughputs. Thus the hydrogen throughput can be increased without needing to increase the electrical power to the plasmatron but at conditions that reduce the hydrogen yield. It is also possible to inject additional amounts of fuel after the plasma fuel converter and produce a final gas composition close to stoichiometric at partial oxidation conditions.

In another preferred embodiment, the power to the plasmatron is adjusted by changing the frequency of operation of the power supply. In yet another embodiment, dielectrics cover one or both of the electrode surfaces so that microdischarges are generated across the gas. It is also preferred that the fuel and air be introduced in a region such that the flow carries the reagents to a region close to the discharge.

DESCRIPTION OF THE PREFERRED EMBODIMENT

Figure 1:
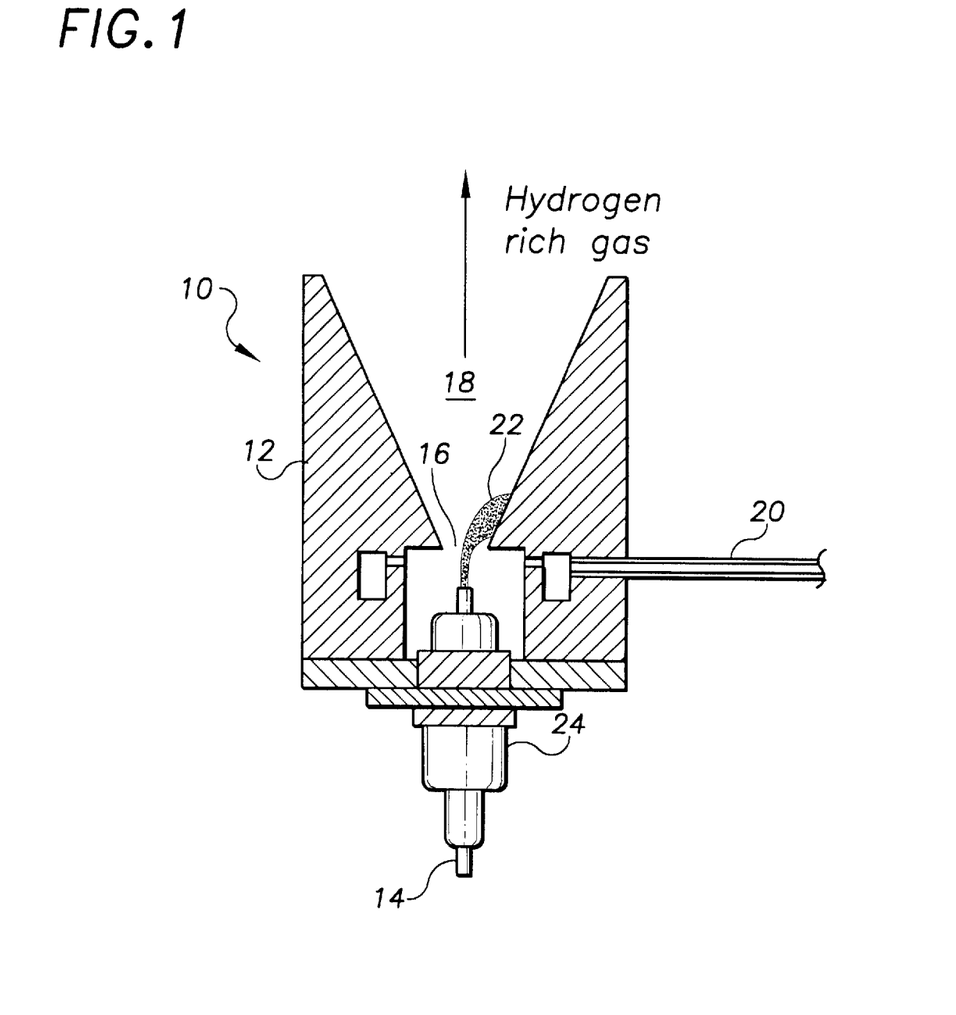
FIG. 1 is a cross-sectional view of a high voltage, low current discharge plasma fuel converter according to the invention.

With reference now to FIG. 1, a plasma fuel converter 10 includes a conductive structure 12 and an electrode 14. The conductive structure 12 and the electrode 14 form a gap 16 within a reaction chamber 18. An air fuel mixture is introduced into the reaction chamber 18 through a conduit 20 which results in a radial introduction. As will be described below, when energized by a suitable power supply, a discharge 22 occurs across the gap 16. The energy in the discharge 22 serves to reform the fuel portion of the air-fuel mixture to generate hydrogen rich gas. The electrode 14 is electrically isolated from the conductive structure 12 by an insulator 24.

Figure 2:
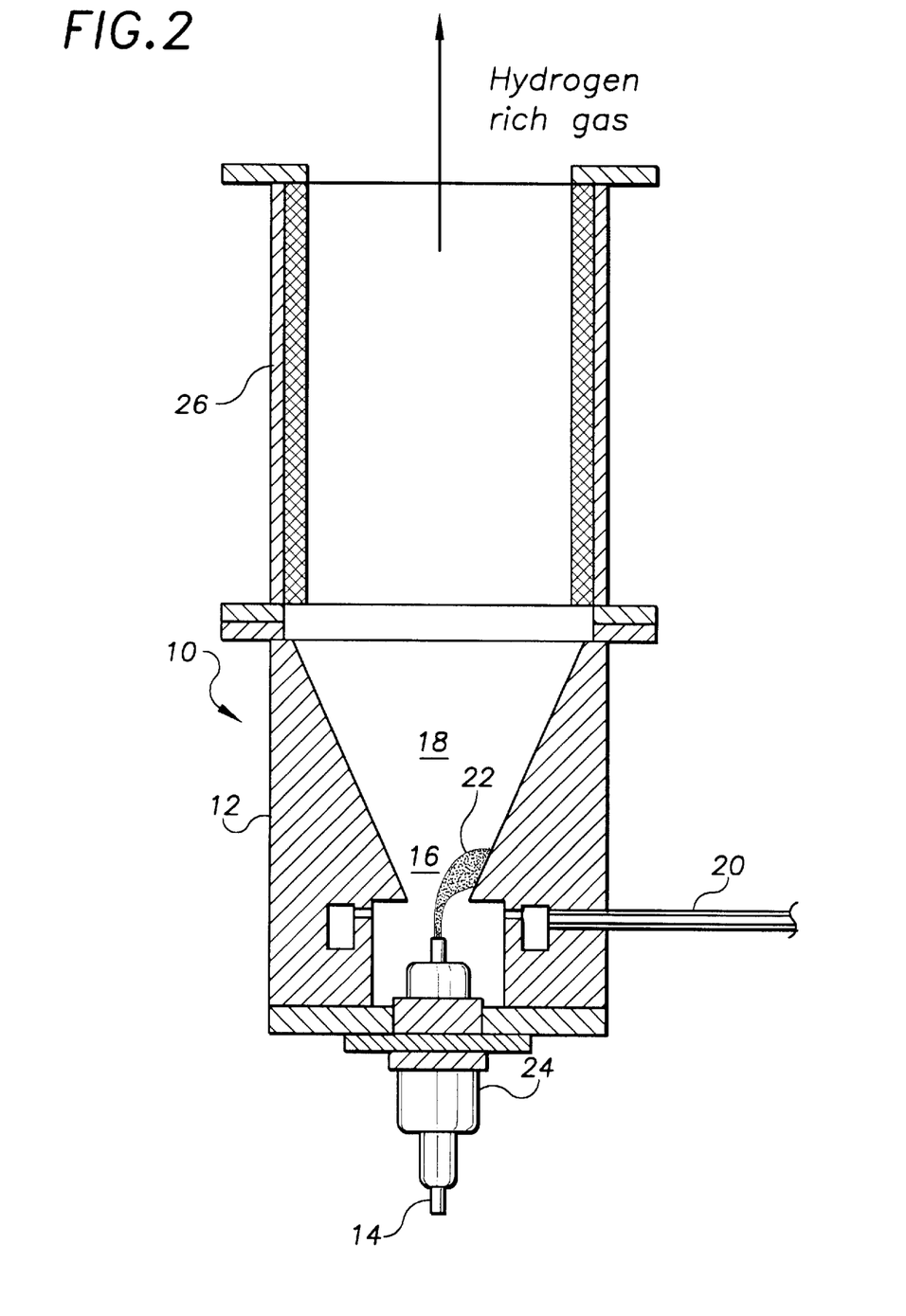
FIG. 2 is such a plasma fuel converter including a reaction extension cylinder.

FIG. 2 shows the embodiment of FIG. 1 but including a reaction extension cylinder 26 which increases the residence time of the reactants in the high temperature zone thereby increasing the hydrogen rich gas yields.

Figure 3:
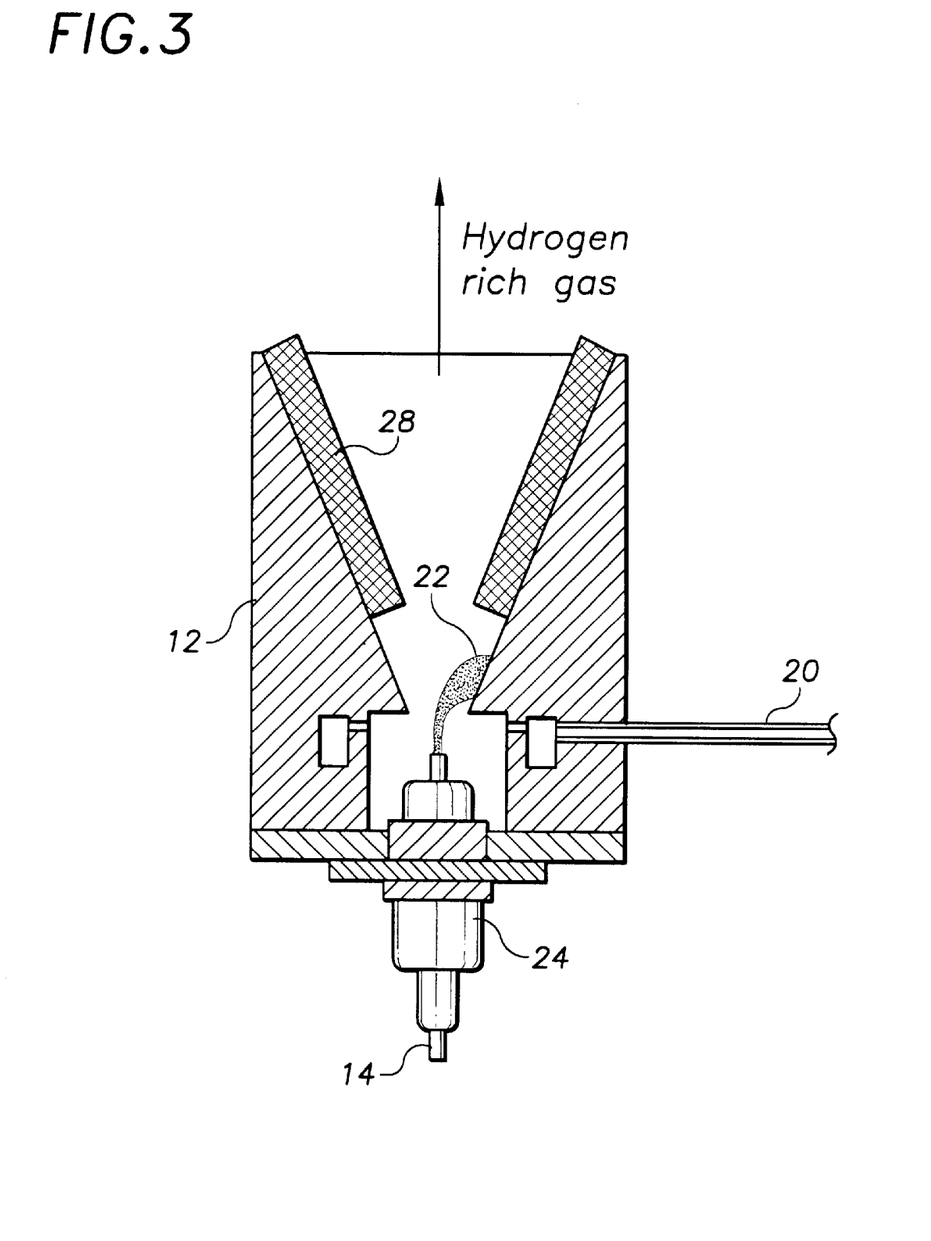
FIG. 3 is a cross-sectional view of a high voltage, low current glow-discharge plasmatron with thermal insulation.

It is possible to increase yields further by minimizing heat losses downstream from the plasma discharge 22. As shown in FIG. 3, minimizing heat losses can be achieved by the use of a thermal shield 28 in the region immediately downstream from the plasma and in the reaction extension cylinder 26 that is further downstream. The thermal shield 28 may be a thin metallic barrier with low thermal capacity (and therefore short thermal response time) to minimize radiation losses: Alternatively, the thermal shield 28 may be a ceramic barrier having low thermal conductivity but with increased thermal capacity and therefore increased thermal response time.

Figure 4:
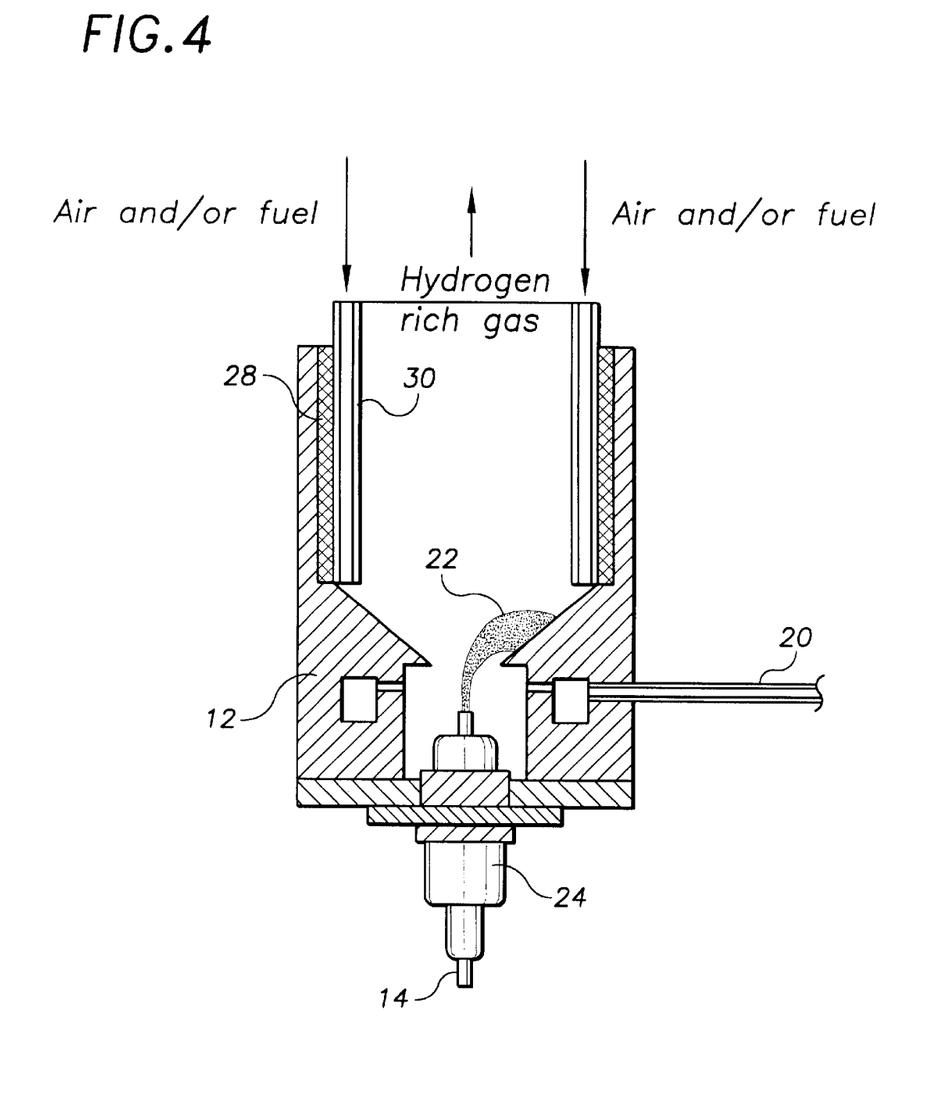
FIG. 4 is a cross-sectional view of a high voltage, low current glow-discharge plasmatron including a heat exchanger.
Figure 5:
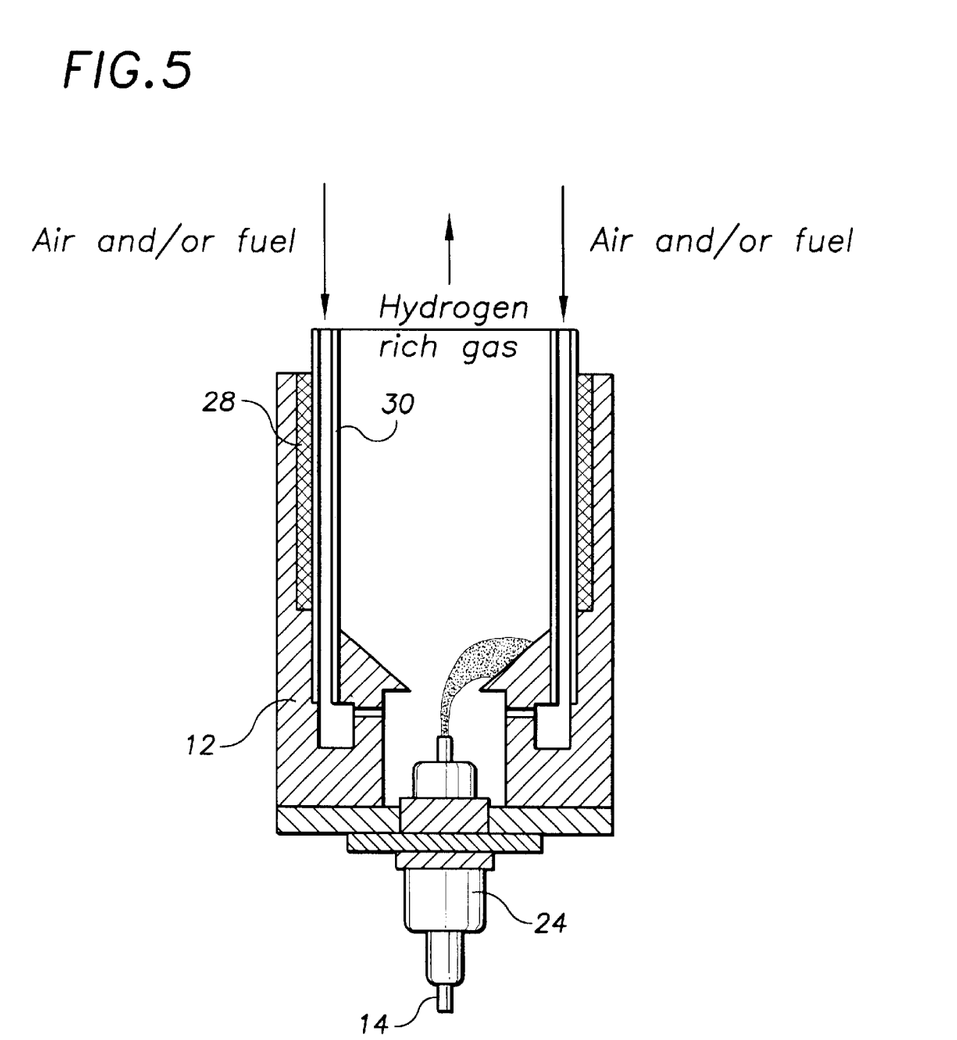
FIG. 5 is a cross-sectional view of another glow-discharge plasmatron with a heat exchanger.

As shown in FIGS. 4 and 5, instead of a thermal barrier, a compact heat exchanger 30 can be used to preheat part of the air and/or part of the fuel in a counter-flow heat exchanger configuration.

Figure 6:
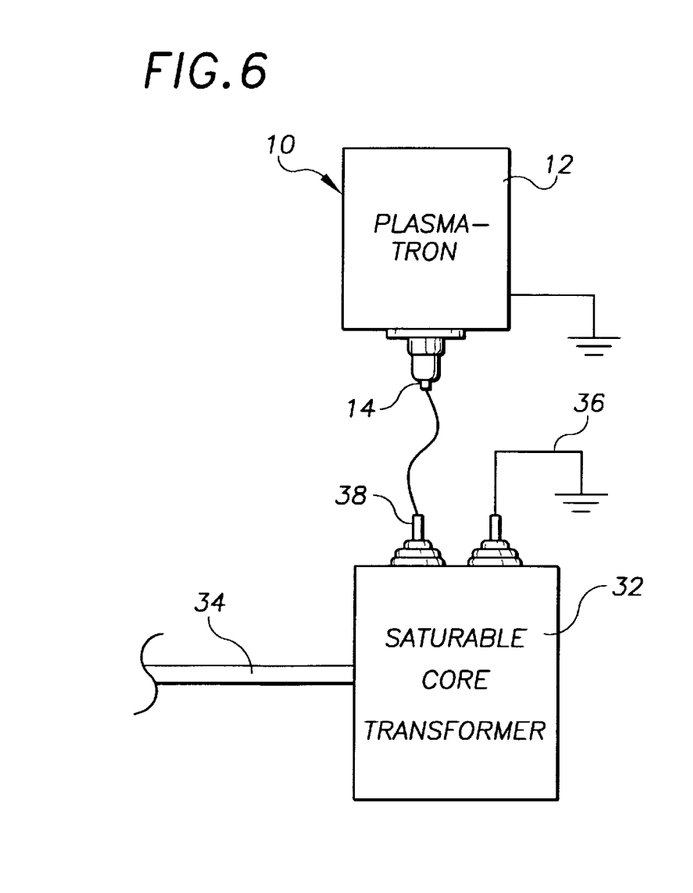
FIG. 6 is a circuit diagram of a high voltage, low current microplasmatron connected to a power supply with one grounded electrode.
Figure 7:
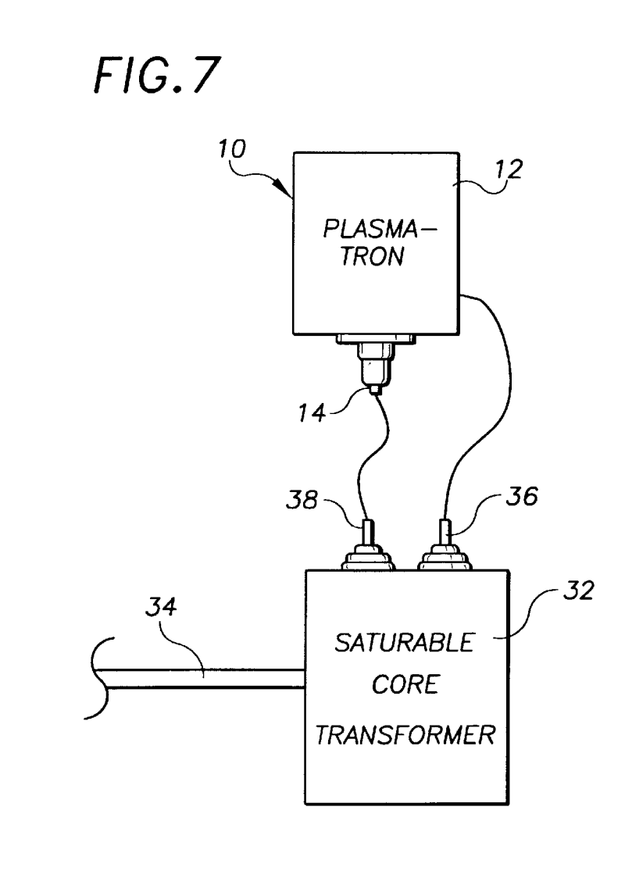
FIG. 7 is a circuit diagram of a high voltage, low current microplasmatron connected to a power supply with both electrodes connected to the microplasmatron.
Figure 8:
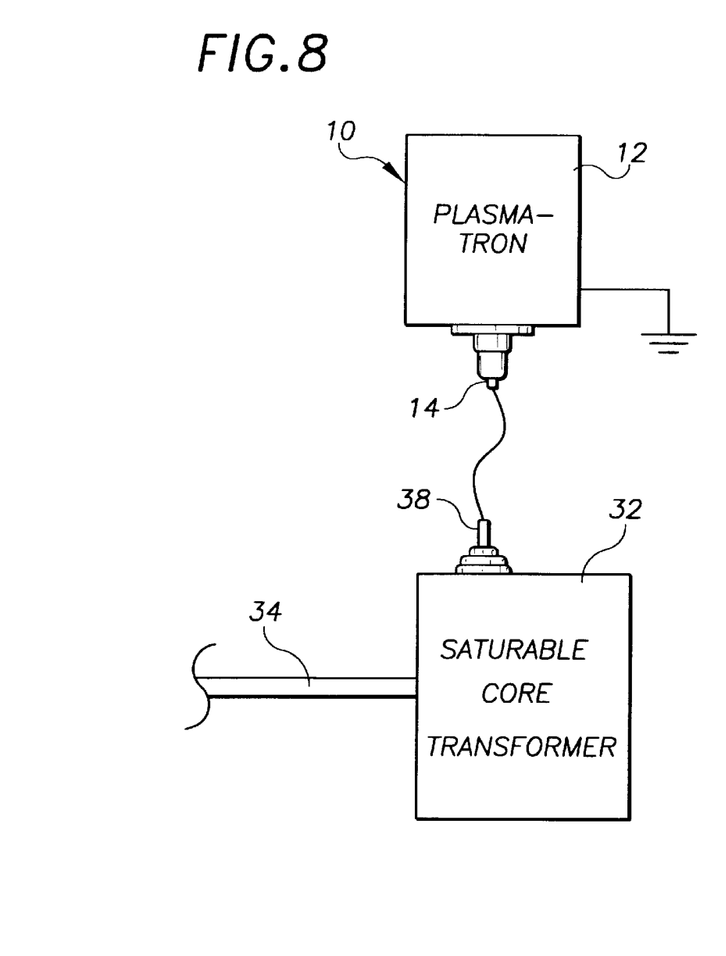
FIG. 8 is a circuit diagram of a high voltage, low current microplasmatron connected to a power supply with a single electrode connected to the microplasmatron.

As discussed above, the plasma fuel converters of the invention are energized with a current controlled, high voltage power supply used for driving the glow discharge type of plasmas. FIG. 6 shows one circuit arrangement. A saturable core transformer 32 draws power from power mains 34, which can carry either AC or DC current. The AC power can be obtained from a conventional AC power source, or it can be generated from DC (for example, onboard vehicles) by the use of a DC-AC converter. In this arrangement, the saturable core transformer has one grounded electrode 36 and another electrode 38 is connected to the electrode 14 of the plasmatron 10. The conductive structure 12 of the plasmatron 10 is also grounded. Another circuit arrangement is shown in FIG. 7 in which both power supply 32 electrodes 36 and 38 are connected to the plasmatron 10. This arrangement requires extra safety precautions (additional insulation) but delivers fill power to the plasma in the plasmatron 10. Yet another arrangement is shown in FIG. 8 in which the single electrode 38 is connected to the plasmatron 10. In this case the voltage supply requires higher voltage insulation to deliver the same power.

There are several methods of adjusting the power in a low power plasma fuel converter. It can be varied by changing the voltage applied to the saturable inductor (neon transformer or comparable device). A second method is by operating a number of plasma fuel converter units in either a parallel or a series configuration, increasing the power by increasing the number of units operating. A third method of adjusting the power is by changing the frequency of operation of the power supply. As described above, the power to the plasma discharges is time varying. The higher power occurs at the discharge initiation time, when the voltage is very high and the current low, and during which gas breakdown occurs. At this time, the high voltage generates relatively energetic electrons that very efficiently generate radicals and efficiently couple their energy into the gas, with minimal voltage drops (sheaths) near the electrodes. The power decreases as the discharge approaches the glow-like regime. Frequencies as high as 100–200 kHz and even higher can be achieved using state of the art solid state components, such as IGBT's.

By operating at higher frequencies, it is possible to maximize operation at the higher voltage, higher efficiency breakdown-like regime, and minimize operation at the lower voltage, glow-discharge regime. The frequency of a resonant inverter can be controlled and by simply varying the frequency, the power can be altered.

Figure 9:
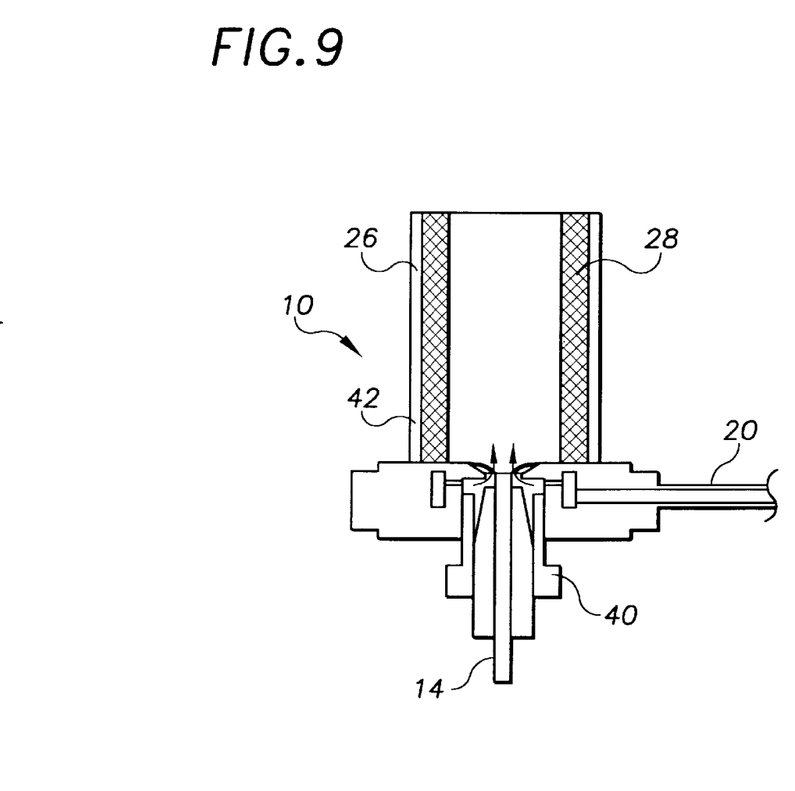
FIG. 9 is a cross-sectional view of the a plasmatron of the invention using a conventional spark plug as one of the electrodes.

The inventors herein have experimentally achieved plasma fuel converter operation at lower levels of around 50 watts. Although a neon transformer power supply was used in our experiments, it is not the only possible power supply. A current controlled, high voltage power supply can also be used for driving the glow-discharge type of plasmas. FIG. 9 is a schematic of the experimental plasmatron 10. One electrode of a conventional spark plug 40 was used in these experiments as the electrode 14. The other electrode is a steel tube 42 which is maintained at ground potential (the ground electrode from the spark plug 40 has been removed). This experimental plasmatron was operated with gasoline in the high voltage-low current mode of the invention. The power supply was a saturable transformer (neon transformer). Two such units, of 50 watts each, were connected in parallel. It is not known whether the fill 100 watts from both units was being applied to the plasmatron. The actual power input into the plasmatron 10 may actually be less than 100 watts. The power supply was AC, operating at line frequency. The plasmatron was connected to a conventional reaction extension cylinder 26 to increase the residence time and increase conversion efficiency.

The results from tests (after optimizing the air/fuel ratio) are shown in Table 1. Energy consumption has been decreased by about one order of magnitude compared with results obtained with conventional low voltage-high current plasma reformers. The electrical energy consumption per hydrogen produced has been decreased by about a factor of 5.

TABLE 1

| | |
|---|---|
| Plasma Air g/s | 1.1 |
| Gasoline g/s | 0.12 |
| Product gas composition (% vol) | |
| Hydrogen | 10.3 |
| CO | 16 |
| CO2 | 6 |
| Nitrogen | 70 |
| Methane | 0.7 |
| Energy consumption | |
| kJ/mol fuel | 100 |
| Mj/kg H2 | 12 |
| Conversion yield | |
| To Hydrogen | 54% |
| To CO | 87% |

The electrode 14 showed no signs of degradation leading to the expectation that long electrode life will be possible operating the microplasmatron reformer in the low current high voltage mode of operation according to the invention. In addition, no cooling water was required and air pressure requirements were substantially decreased. It is also expected that performance can be improved with better ways of introducing fuel into the reactor using a nozzle/atomizer.

The present invention may also be very useful for operation at higher pressures. High pressure increases the required voltages for both breakdown and for glow discharge sustenance. High pressure operation with low voltage DC arc plasmatrons is very difficult, due to very high electrode wear. The high voltage, low current operation of the plasmatron removes this difficulty. The increased voltage with increasing pressure at some point requires sophisticated high voltage insulators and feedthroughs. A possible application could be hydrogen addition in gas turbines, injecting the hydrogen rich gas downstream from the turbine compressor at or before the main fuel injection. This could have the benefit of extending the lean burn limit of the turbine, further decreasing the emissions and possibly increasing the turbine efficiency.

In addition, the type of electrical power supply that is being considered can be combined with a conventional DC arc power supply. When connected in a parallel configuration, the neon transformer power supply can be used to stabilize the arc and during transients, such as start up, power variations or variations, in throughput through the plasma of fuel, air or other flows. When connected in parallel, the requirements on stability that are imposed on the DC power supply can be eliminated, making it cheaper. One possibility is to use a plasmatron that is connected directly to a rotating generating unit (such as an automobile generator) to provide the bulk of the power, and then to utilize the other power supply to provide the stabilization and the turn-on requirements.

In addition, it is possible to operate the plasmatron with either power supply on. When the DC plasmatron power is on, it operates at high power, while when operating in the glow-like mode with the DC plasmatron power supply not providing any electricity, it operates at low power. A large dynamic variation of power, from tens of watts to 1–2 kW can be achieved in this manner. This dynamic range can be used for load following of the engine, or for a different mission. For example, the gas throughputs required for engine exhaust catalyst regeneration can be substantially lower than the throughputs required for hydrogen additive operation or cold start. In this manner, if the momentary hydrogen requirements call for small throughput, the plasma fuel reformer can operate in a glow-like discharge mode, while for higher hydrogen requirements, it can operate in a combination of both modes.

These low power plasma fuel converters are particularly attractive for plasma fuel converter-catalyst regeneration applications. Low voltage DC arc plasmatrons, with a limited capability of low power operation, need to operate with very low duty cycle for this application, due to the low average demands on hydrogen production. By operating the hydrogen generator in a high-voltage, low-current mode, it is possible to decrease the plasmatron power and operate with high duty cycle.

Each high voltage, low current glow-discharge plasmatron may operate with only about 100 watts. It is possible to increase the power by placing several high voltage, low current discharges in the plasma fuel reformer. The high voltage, low current glow-discharge plasma sources can be connected to a single power supply, either in a series or in a parallel configuration. However, the preferred embodiment is for each high voltage, low current glow plasmatron to be connected to its own power supply.

In addition to catalyst regeneration, applications include cold start emissions reduction in spark ignition internal combustion engines and nitrogen oxides reduction during the entire driving cycle. Other applications include hydrogen production for diesel engines, fuel cells and gas turbines, and for small hydrogen sources for industrial applications. The stand alone, low power, low current plasma fuel converter devices may be particularly useful for small power engines (with generated power levels in the 1–40 kW range).

Figure 10:
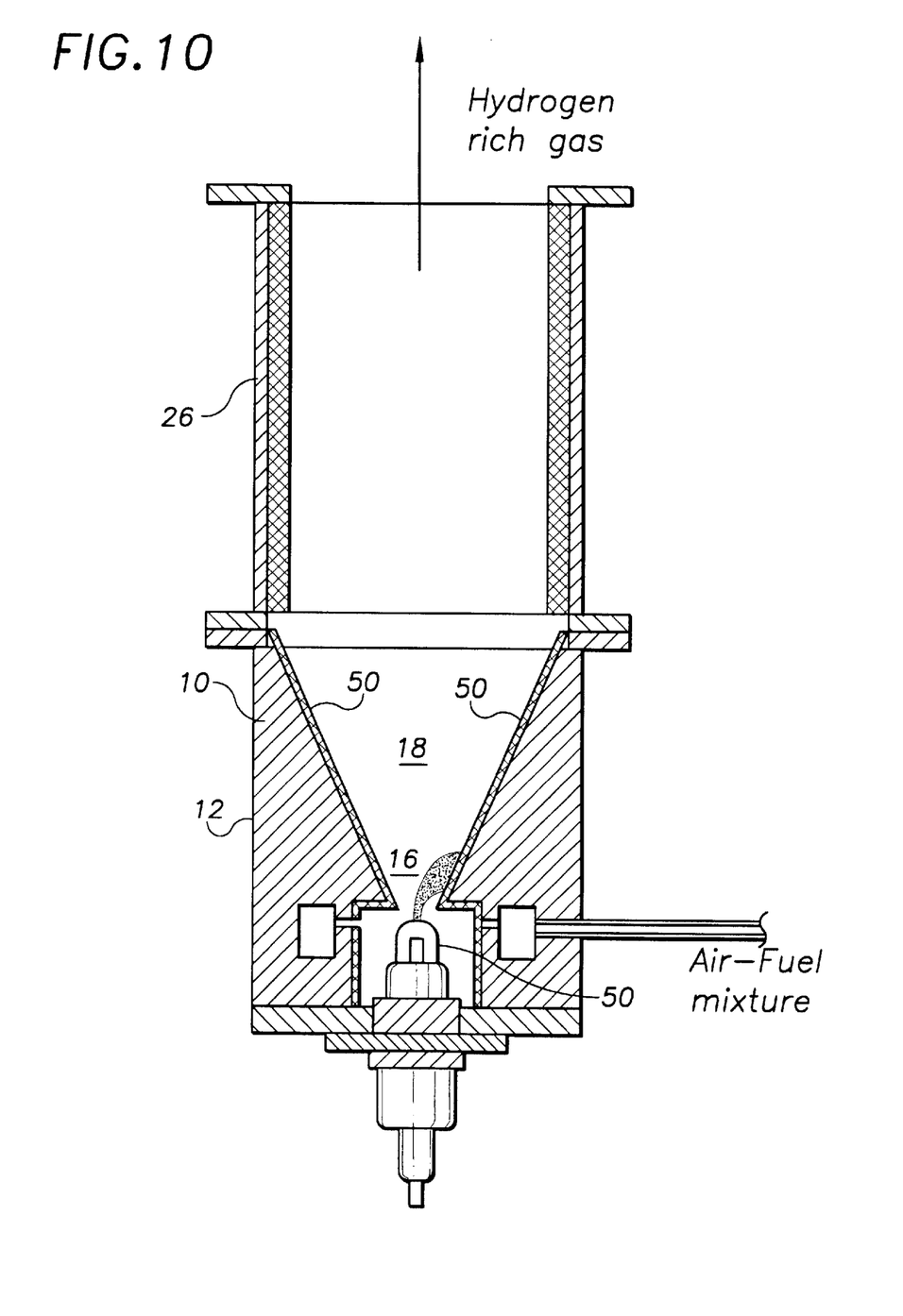
FIG. 10 is a cross-sectional view of an embodiment with dielectric covering on the electrodes.

The embodiments discussed above indicate the operation with electrodes in direct contact with the plasma. This method is most suitable to DC or low frequency AC discharges. As the frequency of the discharge increases, it is possible to eliminate the need of direct electrode contact with the discharge. As shown in FIG. 10, if a dielectric material 50 is placed between the electrode and the gas, microdischarges can be generated across the gas. These microdischarges have very short duration (on the order of and less than 1 microsecond), and operate at high voltage and high current. The microdischarges are quenched when charge build-up in the dielectric decreases the voltage below that required for current sustenance. This type of discharge is called a silent discharge.

A plasmatron fuel converter using the silent discharge mode of operation minimizes the power loss to a cooled or cold electrode by the use of high temperature operation of the dielectric 50. This mode of operation allows for very long lifetime, since the current on the electrode is small and the dielectric material can be made of high strength, high temperature ceramics.

It is possible to place the dielectric coating 50 at both electrode surfaces, or on just one of the surfaces. The power capabilities of the silent-discharge type of plasmatron is lower than that of the uncovered dielectric plasmatron, but the energy efficiency may be higher. The power can be varied, as described above, by changing the frequency of operation of the power supply that drives the discharge.

The plasma is needed in order to initiate and maintain the partial oxidation reactions in the plasma fuel converter during transients. During startup, when the plasma fuel converter surfaces are cold, greater thermal energy may be required to achieve the required temperature. During startup it is therefore necessary to operate the plasma fuel converter at relatively high power and/or with oxygen/fuel ratios higher than during normal operation when the surfaces are warm. The increased burn-up of the fuel by the higher oxygen/fuel ratios can result in decreased hydrogen rich gas yields (where the yield is the ratio between the hydrogen in the reformate divided by the amount of hydrogen in the fuel). Increased throughput of hydrogen-rich gas for the vehicle startup period can be achieved by increasing the oxygen/fuel ratio simultaneously with the increase in air and fuel flow rates. The hydrogen yield decreases, but the hydrogen-rich gas throughput increases. The plasma needs to be operational in order to increase the stability of the reaction, both through direct ignition of the gases and by providing radicals that enhance the chemical reactions. We have thus demonstrated very fast turn on times for hydrogen rich gas production, with operation of oxygen-to-carbon atomic ratios between 1.2 and 2.5.

After warm-up of the plasma fuel converter, operation normally occurs at an oxygen/fuel ratio closer to stoichiometric partial oxidation (with the oxygen/carbon atomic ratio equal to 1–1.5). It may be possible to turn the plasma on and off, in an intermittent fashion. Intermittent operation of the plasma decreases the electrical energy consumption. The flexibility of the fuel reformer is increased by trading off decreased electrical energy consumption of the plasma by decreased hydrogen yield. It is possible to operate the reformer with the plasma on at oxygen/fuel ratios closer to conditions of stoichiometric partial oxidation than when the plasma is off. The regime of operation (plasma on, increased hydrogen yield vs. plasma off, decreased hydrogen yield) can be determined by optimization of the overall system.

During transients when the throughput of the hydrogen rich gas is altered, operation with the plasma on can provide stability to the fuel reformer. Finally, once the electrical energy consumption by the plasma has decreased to levels substantially lower than the energy loss from the partial oxidation process, then the plasma operation does not affect the overall system efficiency, and can be left operating to provide additional stability to transients.

The efficiency of conversion by partial oxidation of hydrocarbon to hydrogen rich gas can vary due to finite heat losses, random transients (for example, generated by vibration, acceleration, sudden changes in flow, fuel contamination, dust in air, etc.) and changing hydrogen rich gas throughput. To compensate for decreased reforming efficiency, it is necessary to either: a) turn on the plasma (in the case of intermittent plasmatron operation); b) increase the plasma power if the plasma is already on; c) increase the oxygen-to-carbon ratio (by increasing the oxygen-to-fuel ratio) to increase the heat generated by the reforming process; or d) a combination of any or all of the above. It is therefore necessary to monitor the reforming process.

During efficient reforming, the oxygen concentration of the reformate is very low, usually less than 1%. Higher concentrations in the reformate indicate poor reforming. Oxygen detection, by the use of conventional oxygen sensors can therefore be used to monitor the reforming process and to control the plasmatron operation (power and oxygen/fuel ratio).

The operation of the plasmatron in the high-voltage low current mode allows operation of the fuel reformer at high pressures. For high-pressure operation, upstream air and fuel compressors are needed (which, for the case of a turbine driven by hydrogen-rich gas, are built into the system).

Figure 11:
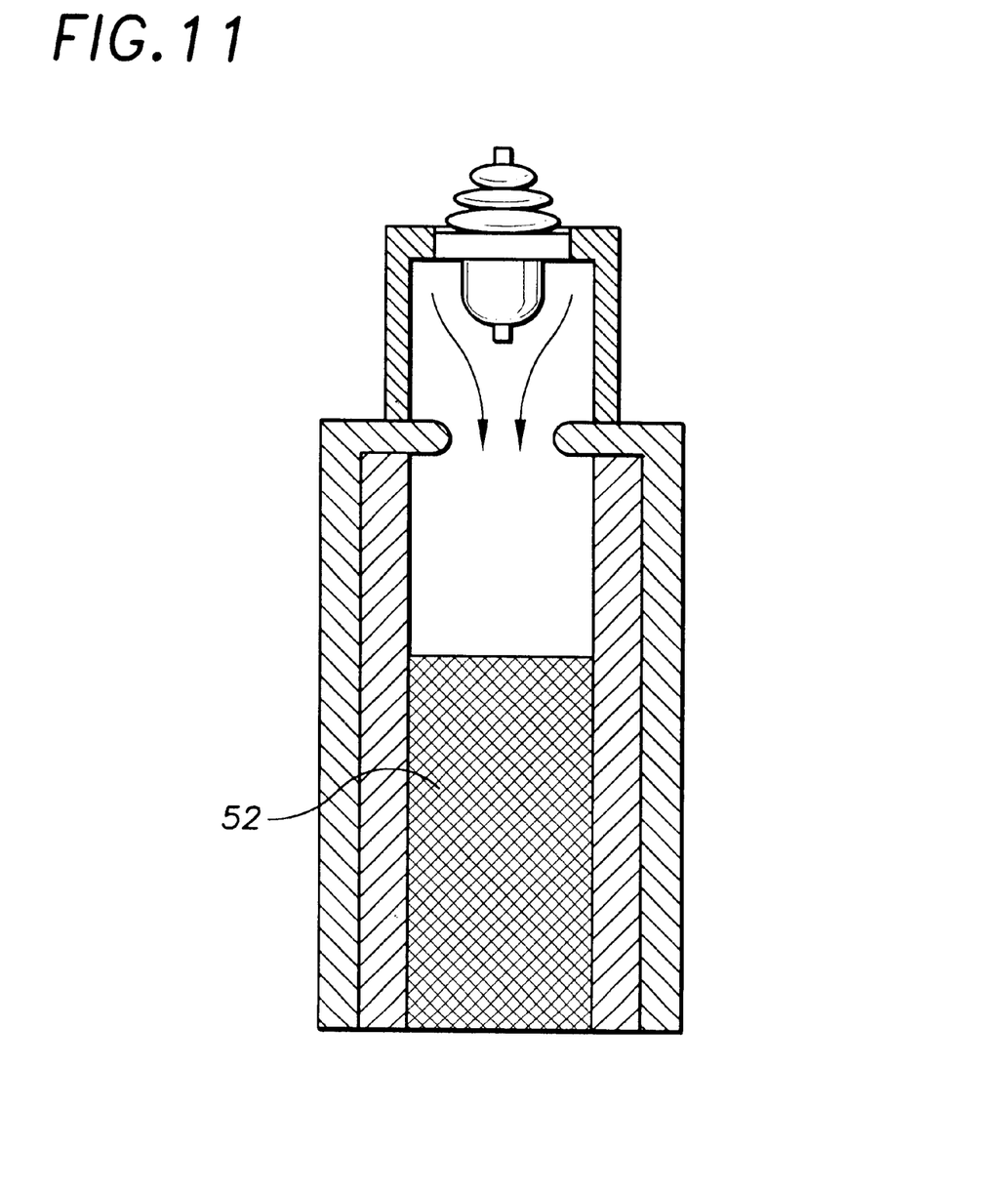
FIG. 11 is a cross-sectional view of an embodiment of the invention employing a frit.

In order to maximize the throughput and the conversion yield of hydrocarbon into hydrogen, it is attractive to introduce mixing downstream from the plasmatron. In this way the size and number of pockets that are either of elevated or reduced (with respect to the average) hydrocarbon content are substantially decreased, allowing for higher yield of hydrogen and decreased energy consumption. As shown in FIG. 11, it is useful to place a frit 52 (or comparable material consisting of increased surface area) downstream from the plasma discharge, to increase the mixing. The frit 52 can be either a conventional frit that is used just to increase the mixing, or it can be made of a material that provides a catalytic reaction. In the latter case, the frit 50 is made of a catalytic material on a substrate, such as nickel catalyst on an alumina substrate (ideal for steam reforming).

The preferred method of air injection is to inject some of the air upstream from the plasma. Some of the fuel can be injected into the discharge either prior to the plasma, which is the preferred method for the case of the low power plasma fuel converter (or downstream from the plasma for the high power DC arc plasma fuel converter described in previous patents and patent applications of the present inventors). This is done in order to prevent soot formation across the small cathode-anode gap.

The flow is such that the flame propagates in the same direction as the bulk air flows. In conventional reformers, even if a spark plug discharge is used to initiate the process, the flame propagates at least partially against the main direction of the flow. Having the flow be in the same direction as the flame results in more stable reforming.

The desired flame and flow pattern in the present invention is achieved by having a small region where some or all of the air, and some, all or none of fuel are introduced, upstream from the discharge, and having a region of expansion where the air/fuel mixture propagates at much reduced velocity because of the increased cross section of the expansion region. The expansion region can be followed by a reaction extension region that increases the residence time in the plasma fuel converter. Both the expansion region as well as the reaction extension region are well insulated thermally to minimize enthalpy loss, increasing the yield of hydrogen rich gas.

Although it is best to introduce the air and fuel prior to the discharge, it is not necessary as long as the point of introduction of the air and fuel is near the region of the discharge. The fuel and air are best introduced at a region such that all of the reagents introduced upstream from the plasma flow through the electrode gap. In this manner, the radicals produced by the electrical discharge, and associated enthalpy generation in the gas, is distributed uniformly among the reagents (air and fuel).

Figure 12:
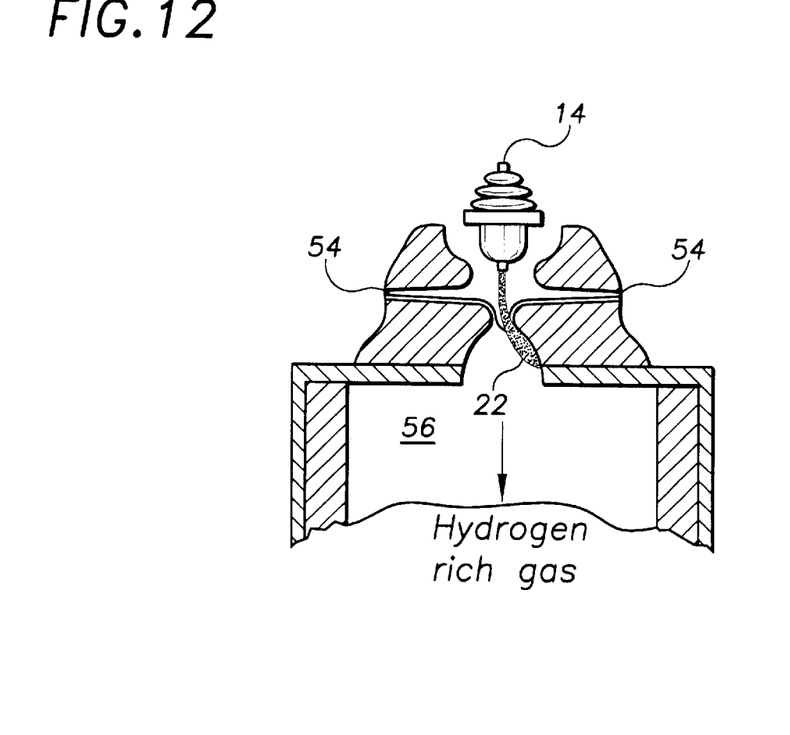
FIGS. 12 and 13 are cross-sectional views of other embodiments of the invention.
Figure 13:
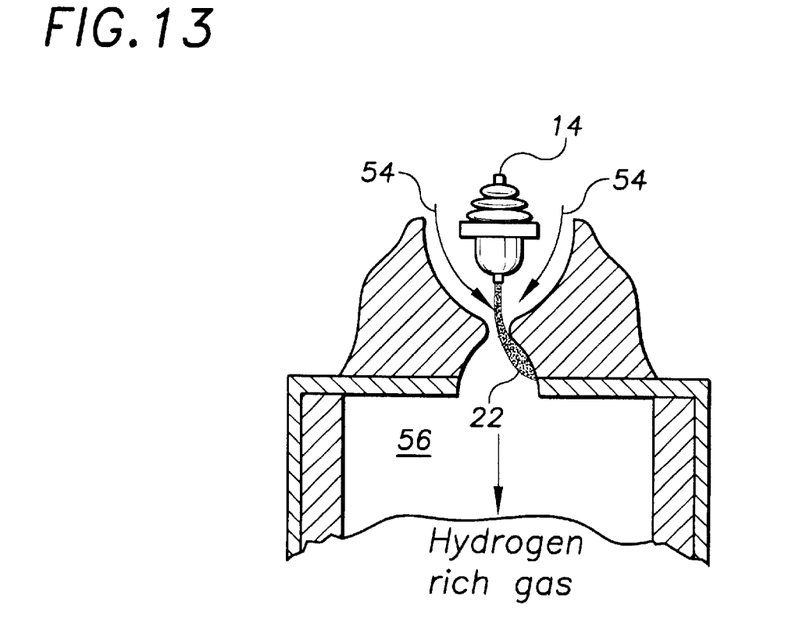

FIGS. 12 and 13 illustrate preferred embodiments with respect to air/fuel flow. Air and fuel 54 are introduced into the region of the discharge 22 and pass into an expanded region 56. As shown in FIG. 13, air and fuel 54 are introduced alongside the electrode 14 in the vicinity of the discharge 22 and proceeds into the expanded region 56.

Returning now to the partial oxidation operation discussed above, in the suggested process the reaction occurs at oxygen-to-carbon ratios of 1.2–2.5. Under these conditions, the product gas has a substantial water content. This water (or steam) can be used to increase the hydrogen production rates by changing (shifting) the carbon monoxide produced in the partial oxidation reaction to hydrogen by a water-gas shift reaction:

$H_2O+CO \rightarrow CO_2+H_2$.

The water-gas shift reaction is slightly exothermic, and it can reach near completion at relatively low temperatures (200–700° C.). Therefore, there can be a heat exchanger downstream from the reaction extension cylinder to decrease the reformate temperature to that optimal for the catalytic water-shift reaction. In this manner, the hydrogen concentration in the reformate can be increased with minimal decrement to the heating value of the hydrogen rich gas.

Figure 14:
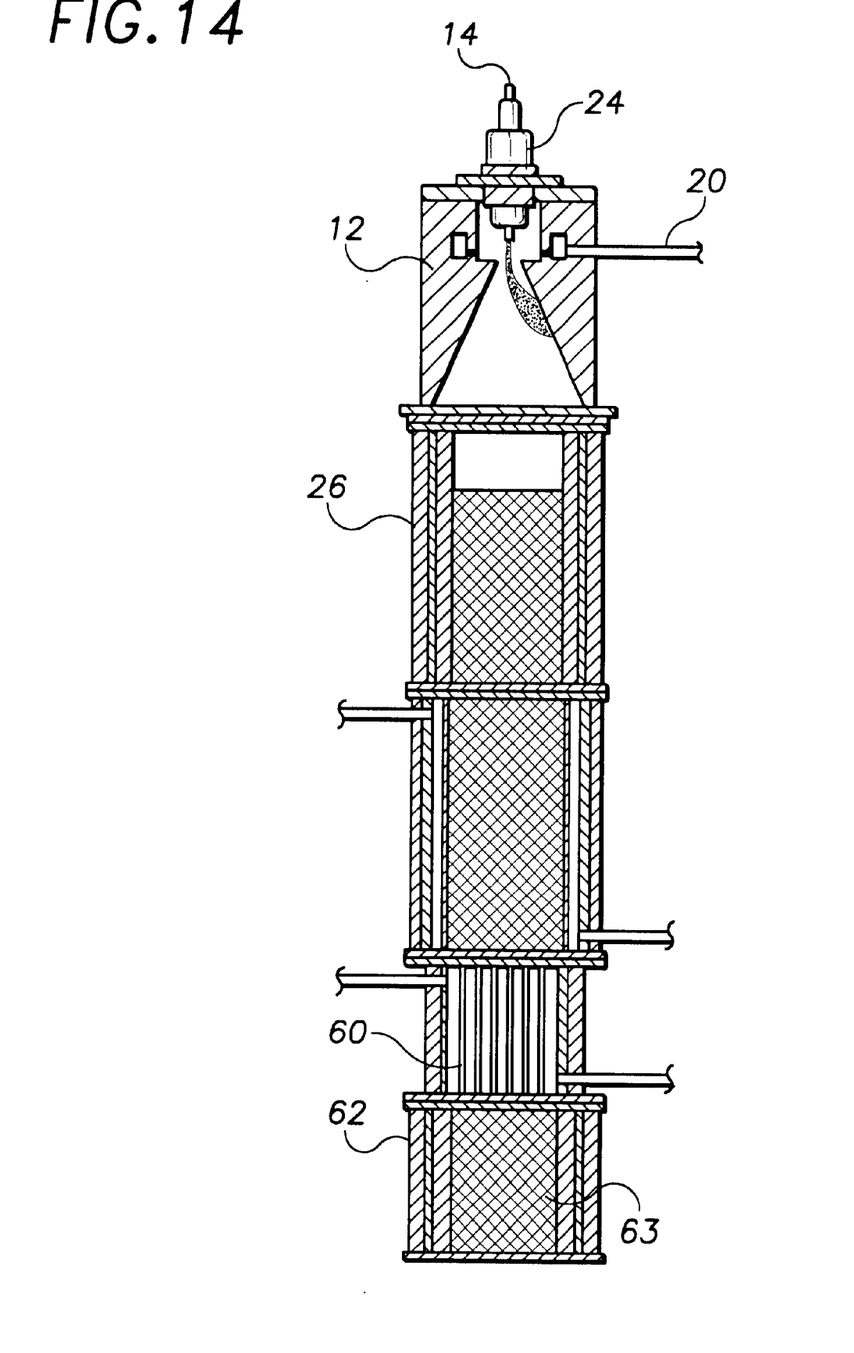
FIG. 14 is a cross-sectional view of an embodiment of the invention employing a heat exchanger and a water-shift reactor.

FIG. 14 illustrates the addition of a heat exchanger and a water-shift catalytic reactor. A heat exchanger 60 is placed downstream from the reaction extension cylinders 26 to decrease the reformate temperature before entry into a water-shift catalytic reactor 62 so as to increase the hydrogen concentration in the reformate. The water-shift catalytic reactor includes a suitable catalyst 63 to promote the water-shift reaction. Thus, the embodiment of FIG. 14 both increases hydrogen concentration and decreases unwanted carbon monoxide.

Figure 15:
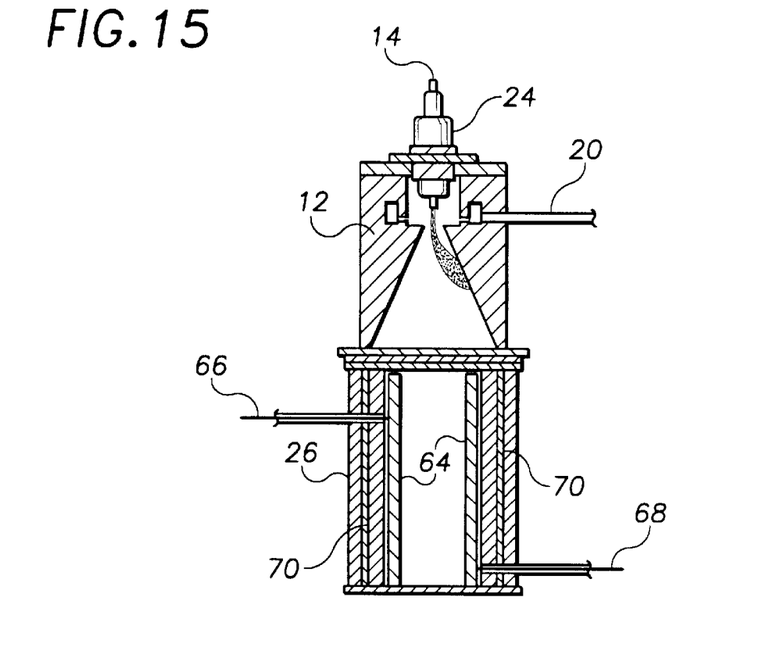
FIGS. 15 and 16 are cross-sectional views of embodiments of the invention with electrically heated reaction extension zones.
Figure 16:
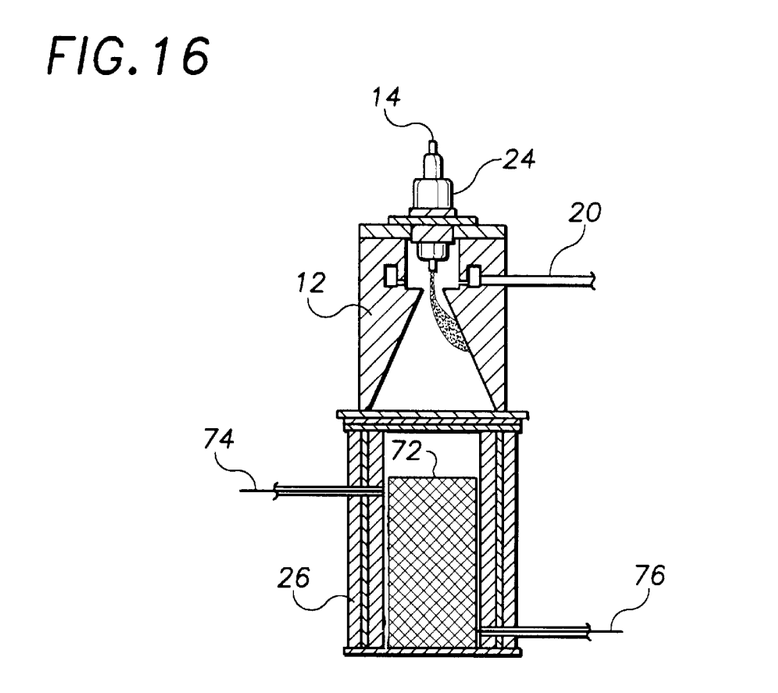

Methods were described earlier in this application to produce the required hydrogen during transients, in particular, the start up transient. These methods included increasing the power of the plasmatron, increasing the number of plasmatrons or increasing the oxygen-to-carbon ratio (thereby increasing the fraction of the fuel that is fully combusted). An alternative is to utilize electrical heating of the reaction extension cylinder 26 as shown in FIGS. 15 and 16. With reference to FIG. 15, electrically heated walls 64 are energized through electrical leads 66 and 68 with high temperature insulation 70 provided adjacent to the electrically heated wall 64. Alternatively, as shown in FIG. 16, an electrically conducting frit or an electrically conducting honeycomb structure 72 is placed in the reaction extension cylinder 26. The frit or metallic honeycomb 72 is heated by driving electricity through electrical leads 74 and 76. The honeycomb structure may have a catalyst on its surface such as the water-shift or steam reforming catalyst as shown in FIG. 14.

It is recognized that modifications and variations of the invention disclosed herein will be apparent to those skilled in the art and it is intended that all such modifications and variations be included within the scope of the appended claims.

What is claimed is:

1. Plasma fuel converter system comprising:
an electrically conductive structure forming a first electrode;
a second electrode disposed to create a gap with respect to the first electrode in a reaction chamber;
a fuel-air mixture residing in the gap, the fuel-air mixture having an oxygen/carbon atomic ratio in the range of 1.2–2.5; and
a current controlled power supply connected to the first and second electrodes to provide voltage in the range of approximately 100 volts to 40 kilovolts and current in the range of 10 milliamperes to 1 ampere to generate a discharge to reform the fuel.

2. The plasma fuel converter of claim 1 further including a reaction extension region to increase residence time in a high temperature zone.

3. The plasma fuel converter of claim 2 further including an insert in the reaction extension region and in the reaction chamber to increase temperature.

4. The plasma fuel converter of claim 3 wherein the insert is metallic.

5. The plasma fuel converter of claim 3 wherein the insert is ceramic.

6. The plasma fuel converter of claim 2 further including a heat exchanger to decrease power from the power supply.

7. The plasma fuel converter of claim 2 wherein the reaction extension region is electrically heated.

8. The plasma fuel converter of claim 7 wherein the reaction extension cylinder includes electrically heated frit and/or electrically conducting honeycomb.

9. The plasma fuel converter of claim 8 wherein the electrically conducting honeycomb includes a catalyst on its surface.

10. The plasma fuel converter of claim 1 wherein the power supply is a current controlled, high voltage power supply.

11. The plasma fuel converter of claim 10 wherein the power supply includes a saturable inductor to limit current.

12. The plasma fuel converter of claim 11 wherein the power supply is a neon transformer power supply.

13. The plasma fuel converter of claim 1 wherein the fuel-air mixture is selected for operation between stoichiometric partial oxidation and full oxidation.

14. The plasma fuel converter of claim 1 further including an additional power supply for operation in a low volt voltage, high current DC arc mode or a high voltage, low current discharge mode.

15. The plasma fuel converter of claim 1 further including a plurality of plasmatron regions to increase hydrogen generation rate.

16. The plasma fuel converter of claim 1 wherein an output of the plasma fuel converter is brought into contact with a catalyst.

17. The plasma fuel converter of claim 16 for nitrogen oxide catalyst regeneration.

18. The plasma fuel converter of claim 1 wherein the fuel and air mixture is introduced upstream from the plasma and additional air/fuel mixture of possibly different composition is introduced downstream from the plasma.

19. The plasma fuel converter of claim 18 wherein substantially all necessary enthalpy increase is provided by means other than the plasma.

20. The plasma fuel converter of claim 18 wherein all of the air and fuel mixture introduced upstream from the plasma flows through the electrode gap.

21. Plasma fuel converter system comprising:
an electrically conductive structure forming a first electrode; a second electrode disposed to create a gap with respect to the first electrode in a reaction chamber;
a fuel-air mixture residing in the gap, the fuel-air mixture having an oxygen/carbon atomic ratio in the range of 1.2–2.5; and
a current controlled power supply connected to the first and second electrodes to provide voltage in the range of approximately 100 volts to 40 kilovolts and current in the range of approximately 10 milliamperes to 1 ampere to generate a plasma.

22. The plasma fuel converter of claim 21 wherein average power to the plasma is between 10 and 1000 watts.

23. The plasma fuel converter of claim 22 wherein the plasma sustains the partial oxidation reaction of hydrocarbon fuel and oxygen.

24. The plasma fuel converter of claim 21 wherein a partial oxidation reaction of hydrocarbon fuel and oxygen produces reaction products that include hydrogen and carbon monoxide.

25. The plasma fuel converter of claim 24 wherein the plasma is a breakdown, glow discharge or a silent discharge plasma.

26. The plasma fuel converter of claim 24 wherein electrical power consumption is between 0.3% to 10% of the thermal power content of the hydrogen rich gas produced by the converter.

27. The plasma fuel converter of claim 26 wherein oxygen to carbon ratio is between 1.2 and 2.0.

28. The plasma fuel converter of claim 24 wherein an oxygen to carbon ratio is 1.2 to 2.0.

29. The plasma fuel converter of claim 24 wherein substantially all necessary enthalpy increase is provided by means other than the plasma.

30. The plasma fuel converter of claim 29 wherein oxygen to carbon ratio is between 1.2 and 2.0.

31. The plasma fuel converter of claim 24 wherein the partial oxidation reaction operation is between stoichiometric partial oxidation and full combustion and further includes a catalytic water-shift reaction region maintained in the temperature range of approximately 200–700° C.

32. The plasma fuel converter of claim 31 further including a heat exchanger prior to the catalytic water-shift reaction region, the heat exchanger adapted to decrease the reformate temperature to that optimal for a water-shift reaction.

33. The plasma fuel converter of claim 21 wherein the power supply has a variable frequency, with power being controlled by adjusting the frequency of the power supply.

34. The plasma fuel converter of claim 33 wherein power supply frequency can be adjusted up to 100–200 kHz.

35. The plasma fuel converter of claim 21 wherein at least one of the first and second electrodes is covered with a dielectric coating to produce a discharge in the gap between either the dielectric or the dielectric-electrode.

36. The plasma fuel converter of claim 35 wherein power is controlled by varying frequency of the power supply.

37. The plasma fuel converter of claim 21 wherein oxygen/fuel ratio of the fuel/air mixture is varied during transient conditions.

38. The plasma fuel converter of claim 37 wherein oxygen to carbon atomic ratio during turn on and normal operation is between 1.2 and 2.5 with or without intermittent operation.

39. The plasma fuel converter of claim 21 wherein the plasma is operating in an intermittent mode.

40. The plasma fuel converter of claim 21 further including an oxygen sensor in contact with the reformate to control conversion efficiency.

41. The plasma fuel converter of claim 40, wherein conversion efficiency is controlled by changing either power level or oxygen/fuel ratios or both.

42. The plasma fuel converter of claim 21 operated at pressures up to 500 psi.

43. The plasma fuel converter of claim 21 further including a material providing increased surface area downstream from the plasma discharge.

44. The plasma fuel converter of claim 43 wherein the material is inert.

45. The plasma fuel converter of claim 43 wherein the material is a catalyst.

46. The plasma fuel converter of claim 43 wherein the material is a nickel based catalyst on an alumina substrate.

47. The plasma fuel converter of claim 21 wherein the fuel-air mixture is introduced at a region such that flow carries all of the reagents through the electrode gap.

* * * * *

UNITED STATES PATENT AND TRADEMARK OFFICE
CERTIFICATE OF CORRECTION

PATENT NO. : 6,322,757 B1  Page 1 of 1
DATED : November 27, 2001
INVENTOR(S) : L. Bromberg et al.

It is certified that error appears in the above-identified patent and that said Letters Patent is hereby corrected as shown below:

Column 1,
Line 7, please insert -- This invention was made with government support under Grant Nos. DE-FG07-98ID13601 and DE-FG04-95AL88002, awarded by the Department of Energy. The United States Government has certain rights in the invention. --

Signed and Sealed this

Fourth Day of June, 2002

*Attest:*

JAMES E. ROGAN
*Attesting Officer* *Director of the United States Patent and Trademark Office*